(12) United States Patent
Geisenberger et al.

(10) Patent No.: US 6,749,674 B2
(45) Date of Patent: Jun. 15, 2004

(54) BLACK TRISAZO METAL COMPLEX DYES

(75) Inventors: Josef Geisenberger, Sulzbach (DE); Andreas Wuzik, Erlensee (DE)

(73) Assignee: Clariant GmbH, Frankfurt (DE)

( * ) Notice: Subject to any disclaimer, the term of this patent is extended or adjusted under 35 U.S.C. 154(b) by 307 days.

(21) Appl. No.: 09/816,180

(22) Filed: Mar. 23, 2001

(65) Prior Publication Data

US 2001/0027734 A1 Oct. 11, 2001

(30) Foreign Application Priority Data

Mar. 25, 2000 (DE) .......................... 100 15 004

(51) Int. Cl.$^7$ .................. C09D 11/02; C09B 45/00
(52) U.S. Cl. ................ 106/31.52; 106/31.48; 106/31.5; 534/708; 534/715
(58) Field of Search ............... 106/31.52, 31.48, 106/31.5; 534/708, 715

(56) References Cited

U.S. PATENT DOCUMENTS

| | | | |
|---|---|---|---|
| 2,213,647 A | * 9/1940 | Crossley et al. | 534/660 |
| 2,259,734 A | * 10/1941 | Crossley et al. | 534/583 |
| 2,769,805 A | * 11/1956 | Hanhart | 534/581 |
| 4,316,032 A | 2/1982 | Bitterli | 548/109 |
| 4,439,562 A | 3/1984 | Bohler | 524/90 |
| 4,468,347 A | 8/1984 | Doswald et al. | 260/147 |
| 4,594,410 A | 6/1986 | Pedrazzi | 534/701 |
| 4,764,175 A | 8/1988 | Dore et al. | 8/437 |
| 4,780,106 A | 10/1988 | Moser et al. | 8/654 |
| 4,799,960 A | * 1/1989 | Baxter et al. | 106/31.48 |
| 4,820,806 A | 4/1989 | Baumann et al. | 534/605 |
| 4,900,812 A | 2/1990 | Moser et al. | 534/627 |
| 5,037,964 A | 8/1991 | Moser et al. | 534/608 |
| 5,053,495 A | 10/1991 | Greenwood et al. | 534/829 |
| 5,188,664 A | 2/1993 | Adamic et al. | 106/31.58 |
| 5,215,578 A | * 6/1993 | Eida et al. | 106/31.48 |
| 5,258,505 A | * 11/1993 | Eida et al. | 106/31.43 |
| 5,352,334 A | 10/1994 | Moser et al. | 162/162 |
| 5,437,716 A | * 8/1995 | Sano et al. | 106/31.52 |
| 5,668,259 A | 9/1997 | Barra et al. | 534/684 |
| 5,698,683 A | 12/1997 | Kaul et al. | 534/692 |
| 5,891,227 A | 4/1999 | Hoffmann et al. | 106/31.28 |
| 6,464,768 B1 | 10/2002 | Bauer et al. | 106/31.52 |

FOREIGN PATENT DOCUMENTS

| | | |
|---|---|---|
| DE | 198 31 095 | 1/2000 |
| EP | 0 825 233 | 2/1998 |
| GB | 2 139 643 | 11/1984 |
| JP | 2-75672 | 3/1990 |

OTHER PUBLICATIONS

Patent abstract for JP 59-093766.
U.S. patent application Ser. No. 09/351,221, no date available.
P. Gregory, "Topics in Applied Chemistry: High Technology Applications of Organic Colorants", Plenum Press, New York, 1991, pp. 15–25, no month available.
PCT Search Report for Application No. PCT/EP 01/02487, mail date Oct. 23, 2001.
XP–002179858 English abstract for JP 2–75672, Mar. 15, 1990.

\* cited by examiner

*Primary Examiner*—Helene Klemanski
(74) *Attorney, Agent, or Firm*—Anthony A. Bisulca

(57) ABSTRACT

Disclosed are metal complexes of trisazo dyes of the general formula 4

(4)

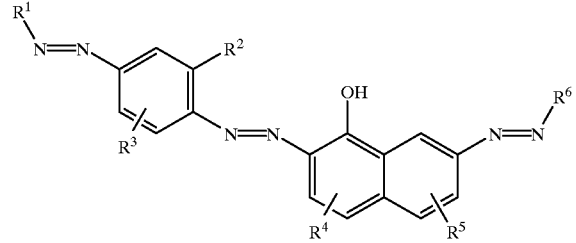

wherein $R^1$ through $R^6$ are as defined in the specification. The dyes are useful for dyeing and printing natural and synthetic fiber materials, recording fluids, especially for the inkjet process, liquid formulations for paper pulp dyeing, and also as colorants for electrophotographic toners, powder coatings and color filters including the dyes of the invention.

14 Claims, No Drawings

BLACK TRISAZO METAL COMPLEX DYES

CROSS-REFERENCES TO RELATED APPLICATIONS

The present invention is described in the German priority application No. 100 15 004.7, filed Mar. 25, 2000, which is hereby incorporated by reference as is fully disclosed herein.

FIELD OF THE INVENTION

The present invention describes black trisazo complex dyes, processes for preparing them and their use in recording fluids, especially for the inkjet printing process, and also as colorants for electrophotographic toners, powder coatings and color filters.

BACKGROUND OF THE INVENTION

The inkjet process is a contactless printing process, which generally speaking exists in two forms: drop-on-demand and continuous stream. The drop-on-demand principle is that the ink in the form of a droplet from a nozzle is placed in the right place at the right time, whereas in continuous stream the ink issues continuously and then either impinges on the receiving medium, for example paper, or is deflected into a collecting vessel. To obtain prints of high definition and resolution, the recording fluids and dyes present in them have to meet very stringent requirements, especially with regard to lightfastness, waterfastness, purity, freedom from particles, solubility, stability in storage, viscosity, surface tension, conductivity, color strength, hue and brilliance (EP-A-0 825 233 and U.S. Pat. No. 5,188,664).

The most important part in all this is played by the dyes used in the inks. Although a large number of dyes have been developed, there are only few which meet the requirements of a modern inkjet printing process.

Initially, traditional dyes from the food, textile and paper sectors were used after specific modification for the inkjet application. This may be illustrated with reference to C.I. Food Black 2 (1), which, as well as structurally similar compounds, was used as a black dye in inks (JP 59-093,766).

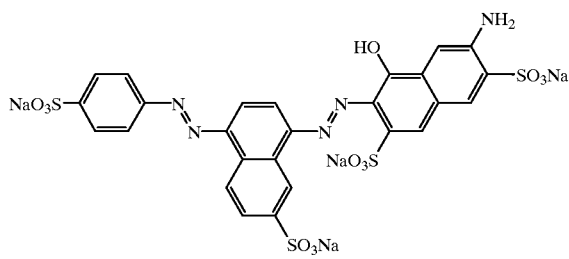

(1)

However, the prints it provides were not a clean black, but bluish black. In addition, the lightfastnesses are unsatisfactory. To minimize these disadvantages, the substituents on C.I. Food Black 2 are varied to obtain black dyes of the general formula (2) which provide a more neutral black and possess improved waterfastness (U.S. Pat. No. 5,053,495).

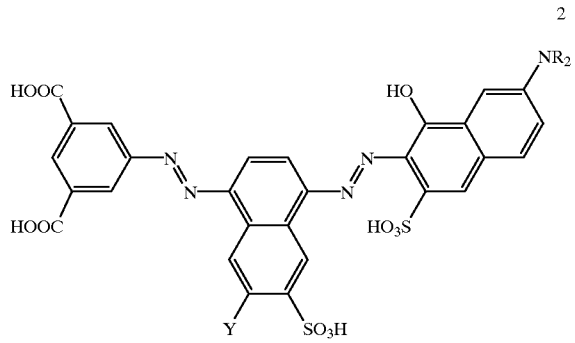

(2)

True, the introduction of the carboxyl groups did provide improved waterfastness, but at the same time had an adverse effect on crockfastness because the dye molecules form aggregates which penetrate into the receiving medium only to a very small extent, if at all.

Improved lightfastness was obtained by using metal complexes of disazo and tetraazo dyes such as C.I. Direct Black 62 (3) (DE-A-19831095).

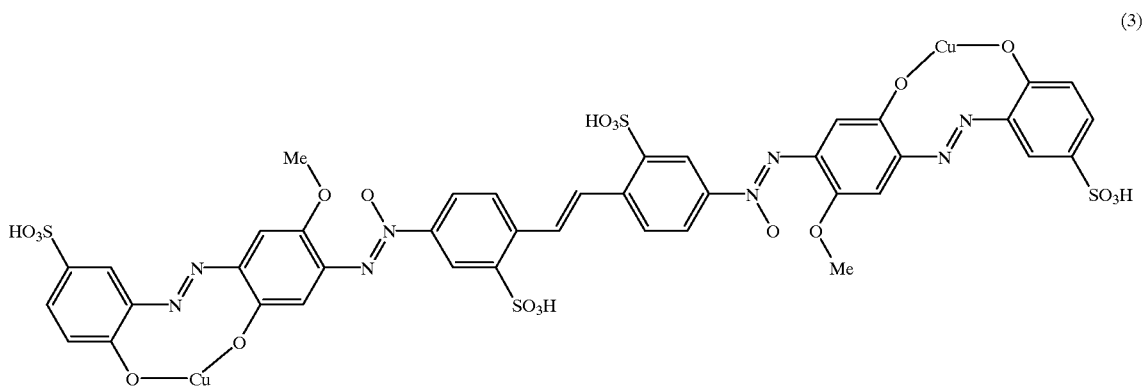

(3)

Although it provides improved fastness properties, dye (3) does not meet all the requirements. For example, as well as having low stability in storage it is insufficiently soluble in the application medium.

SUMMARY OF THE INVENTION

There is accordingly a need for dyes which are superior to prior art blacks especially in ink lightfastness, waterfastness, solubility and stability in storage and at the same time possess the other properties needed for the inkjet sector. It has been found, surprisingly, that the stated requirements are fulfilled by water-soluble dyes defined hereinbelow.

DESCRIPTION OF THE PREFERRED EMBODIMENTS

The present invention accordingly provides metal complexes of trisazo dyes of the general formula (4)

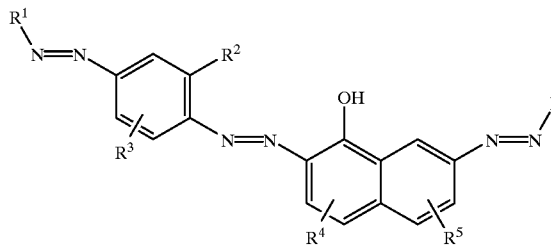

4 where $R^1$ is aryl substituted by one or more, for example 2, 3, 4 or 5, substituents selected from the group consisting of OH, $O(C_1-C_6)$-alkyl, $O(C_1-C_6)$-alkyl-COOM, $O(C_1-C_6)$-alkyl-$SO_3M$, O(hydroxy$(C_1-C_6)$-alkyl), $(C_1-C_6)$-alkyl, COOM, $SO_3M$, $SO_2NH_2$, $SO_2N$(hydroxy$(C_1-C_6)$-alkyl)$_2$, $SO_2NH(C_1-C_6)$-alkyl, $SO_2N((C_1-C_6)$-alkyl)$_2$, $NH_2$, $NH(C_1-C_6)$-alkyl, NHacyl, NHaryl, N(hydroxy$(C_1-C_6)$-alkyl)$_2$, N($(C_1-C_6)$-alkyl)$_2$ and halogen;

$R^2$ is OH, $O(C_1-C_6)$alkyl, COOM or $SO_3M$;

$R^3$, $R^4$ and $R^5$ are identical or different and are each selected from the group consisting of H, OH, $O(C_1-C_6)$-alkyl, $O(C_1-C_6)$-alkyl-COOM, $O(C_1-C_6)$-alkyl-$SO_3M$, O(hydroxy$(C_1-C_6)$-alkyl), $(C_1-C_6)$-alkyl, COOM, $SO_3M$, $SO_2NH_2$, $SO_2N$(hydroxy$(C_1-C_6)$-alkyl)$_2$, $SO_2NH(C_1-C_6)$-alkyl, $SO_2N((C_1-C_6)$-alkyl)$_2$, $NH_2$, $NH(C_1-C_6)$-alkyl, NHacyl, NHaryl, N(hydroxy$(C_1-C_6)$-alkyl)$_2$, N($(C_1-C_6)$-alkyl)$_2$, and halogen, $R^6$ is a mono- or bicyclic carbocyclic or heterocyclic aromatic which is unsubstituted or substituted by one or more, for example 2, 3, 4 or 5, substituents selected from the group consisting of OH, $O(C_1-C_6)$-alkyl, $O(C_1-C_6)$-alkyl-COOM, $O(C_1-C_6)$-alkyl-$SO_3M$, O(hydroxy$(C_1-C_6)$-alkyl), $(C_1-C_6)$-alkyl, COOM, $SO_3M$, $SO_2NH_2$, CONH-phenyl, $SO_2NH$-phenyl, $SO_2N$(hydroxy$(C_1-C_6)$-alkyl)$_2$, $SO_2NH(C_1-C_6)$-alkyl, $SO_2N((C_1-C_6)$-alkyl)$_2$, $NH_2$, $NH(C_1-C_6)$-alkyl, NHacyl, NHaryl, N(hydroxy$(C_1-C_6)$-alkyl)$_2$, N($(C_1-C_6)$-alkyl)$_2$, halogen and phenylsulfo, or is a similarly substituted pyrazole or pyridone radical; and M is hydrogen, a monovalent metal cation, one equivalent of a polyvalent metal cation or an unsubstituted or alkyl-, alkoxyalkyl- or hydroxyalkyl-substituted ammonium ion.

Preference for the purposes of the present invention is given to those dyes of the formula (4) where the complexed metal atom is aluminum, chromium, iron, cobalt, nickel or copper.

In the above definitions, aryl is preferably phenyl or naphthyl and acyl is preferably formyl, acetyl or propionyl.

In the trisazo metal complex dyes of the invention, the metal atom is preferably bonded as depicted in the formula (4a)

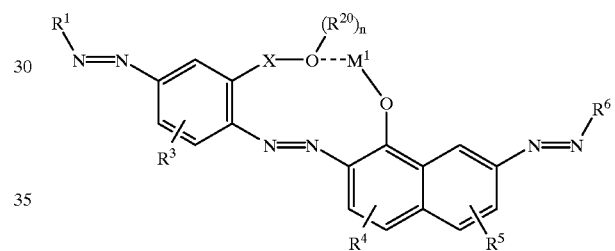

4a where $M^1$ is preferably Al, Cr, Fe, Co, Ni or Cu, especially Cu, $R^{20}$ is $C_1-C_6$-alkyl, n is 0 or 1, and X is a chemical bond, —CO— or —$SO_2$—.

Preferably $R^1$ is a phenyl or naphthalene radical substituted by 1, 2 or 3 substituents selected from the group consisting of OH, $O(C_1-C_6)$-alkyl, COOM, $SO_3M$ and $NH_2$.

Preferably $R^2$ is OH or COOM.

Preferably $R^3$ is H, methyl or $O(C_1-C_6)$-alkyl.

Preferably $R^4$ and $R^5$ are each H, COOM or $SO_3M$.

Preferably $R^6$ is a phenyl, naphthyl, pyridyl or pyrazole radical substituted by 1, 2 or 3 substituents selected from the group consisting of OH, $O(C_1-C_6)$-alkyl, COOM, $SO_3M$, $NH_2$, NHaryl, NHacyl and phenylsulfo.

Preferably M is H, Na, K, Li, Ca/2 or ammonium.

Particular preference is given to the copper complexes of the dyes of formula (4) where $R^1-R^6$ and M each have the preferred meanings mentioned.

Particularly preferred dyes conform to the following formulae (5)–(13):

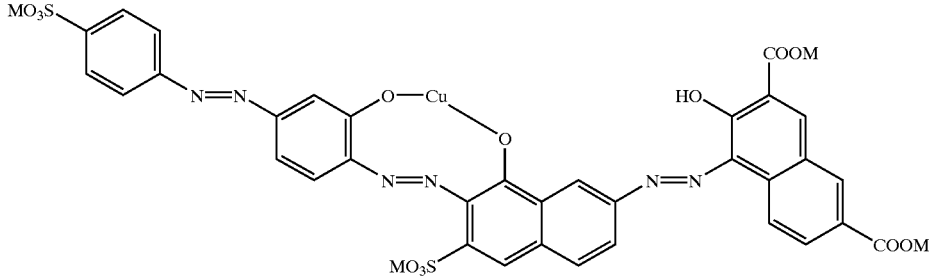
(5)
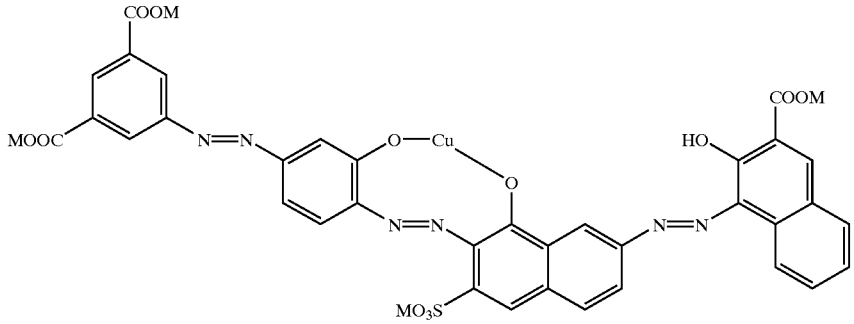
(6)
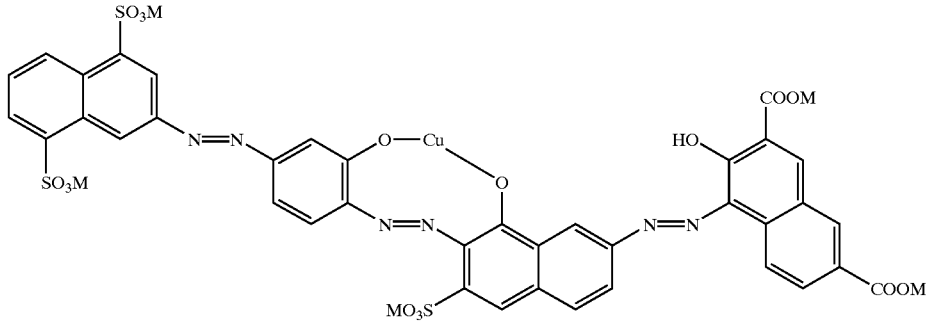
(7)
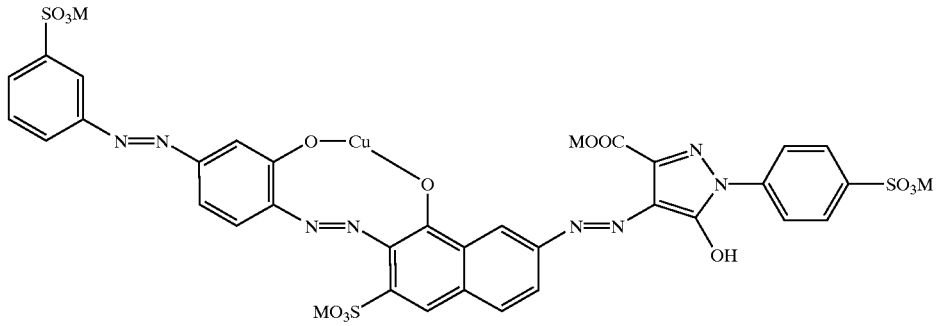
(8)
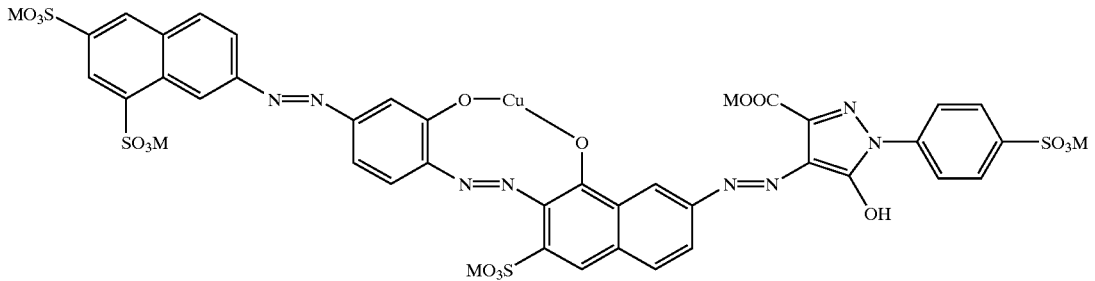
(9)

-continued
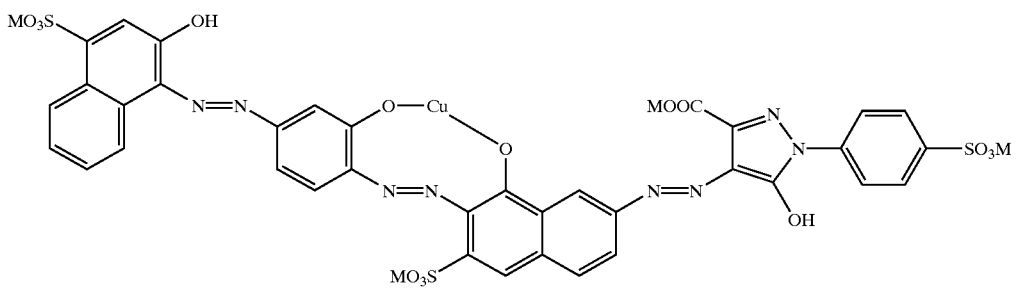
(10)
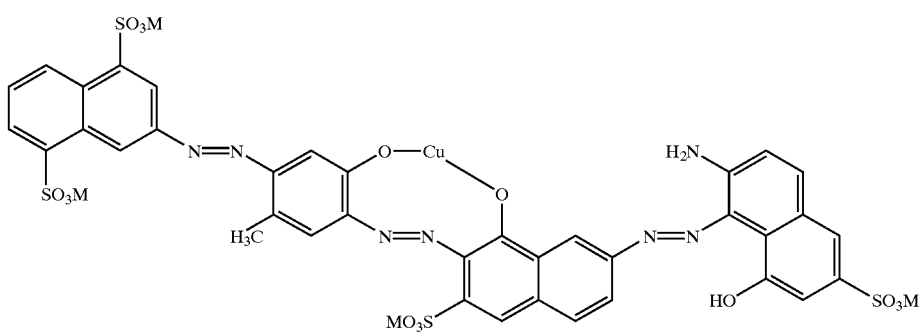
(11)
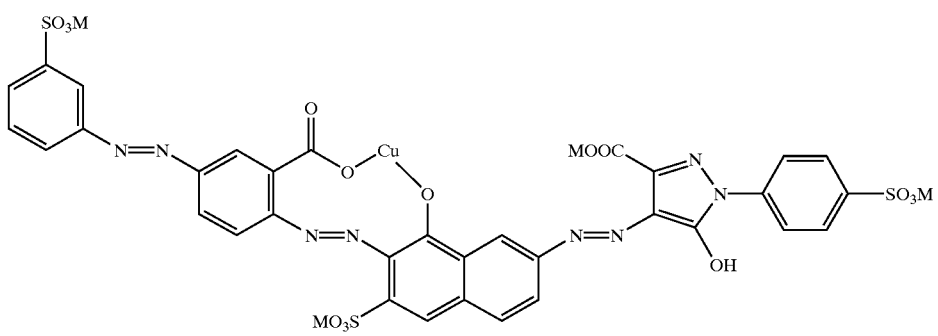
(12)
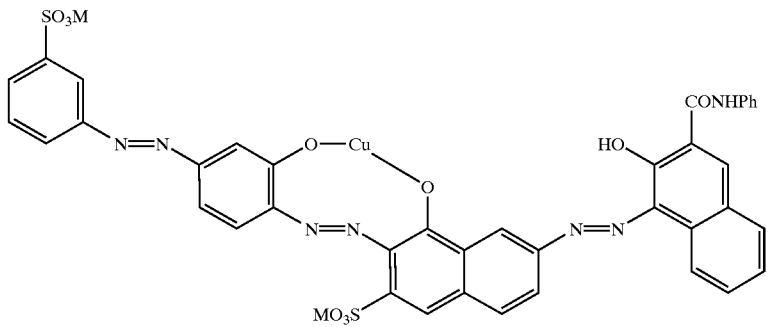
(13)

The present invention also provides a process for preparing a metal complex of a trisazo dye of the formula (4), which comprises diazotizing a naphtholamine of the formula (14)

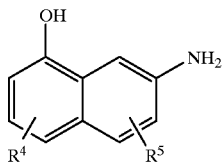
(14)

and coupling the resultant diazonium salt with a compound of the formula (15)

H—R⁶ (15)

and coupling the resultant compound of the formula (16)

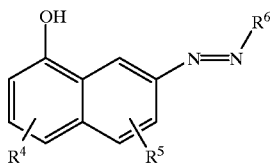
(16)

with the diazonium salt of the formula (17)

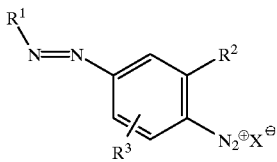
(17)

where $X^{\ominus}$ is an anion, for example chloride or sulfate, and complexing with a metal salt solution.

It is also possible first to carry out a coupling of the compound of the formula (14) with the diazonium salt (17), then a diazotization and the coupling with the compound (15).

It is additionally possible under the same conditions to carry out a coupling of the diazonium salt (17) onto the building block (14), then another diazotization and the coupling with the compound (15). The final step is the metallization with a metal salt solution carried out either according to the same method or by the method indicated in example X.

The diazotization and coupling steps mentioned may be carried out according to customary methods.

The diazotizations are preferably carried out in aqueous solution or suspension with sodium nitrite at 0 to 10° C. and a pH between 1 and 3.

The azo couplings are preferably carried out in aqueous solution or suspension at 0 to 20° C. and a pH between 3 and 9.

The molar ratios between the particular diazonium salt and the particular coupling component are preferably 1:(0.8 to 2).

The complexing with metal $M^1$ is advantageously effected by adding an aqueous metal salt solution, for example a metal sulfate, chloride, bromide, hydrogen sulfate, bicarbonate or carbonate, to the trisazo compound of the formula (4). It is advantageous for the complexing to adjust the pH to 2 to 6 and to heat to a temperature between 60 and 130° C., if necessary under superatmospheric pressure.

The dyes of the invention may also be prepared by the continuous mixing of equivalent amounts of starting materials in the form of aqueous acidic or aqueous alkaline solutions in mixing nozzles and continuous flow reactors with or without a supplementary reaction phase in a reaction vessel.

The dyes of the invention may be isolated from the as-obtained, preferably aqueous, reaction mixtures by salting out, filtration or spray drying, with or without prior partial or complete desalting by means of membrane filtration. However, an isolating step may also be omitted and the reaction mixtures containing the dyes of the invention converted directly into concentrated dyeing solutions by adding organic and/or inorganic bases and/or humectants with or without prior partial or complete desalting by means of membrane filtration. Alternatively, the complex dyes may also be used as press cakes (including in flushing processes, if desired) or as powders.

Useful inorganic bases for concentrated dye solutions include for example lithium hydroxide, lithium carbonate, sodium hydroxide, sodium bicarbonate, potassium hydroxide, potassium carbonate and ammonia. Useful organic bases include for example monoethanolamine, diethanolamine, triethanolamine, 2-aminopropanol, 3-aminopropanol, dipropanolamine, tripropanolamine, N-methylaminoethanol, N,N-dimethylaminoethanol, N-phenylaminopropanol, ethylenediamine, tetramethylethylenediamine, tetramethylpropylenediamine, tetramethylhexylenediamine, diethylenetriamine, triethylenetetramine, triethylamine, diisopropylethylamine and polyethyleneimine.

Useful humectants for concentrated dye solutions include for example formamide, urea, tetramethylurea, ε-caprolactam, ethylene glycol, diethylene glycol, triethylene glycol, polyethylene glycol, butylglycol, methylcellosolve, glycerol, N-methylpyrrolidone, 1,3-diethyl-2-imidazolidinone, sodium xylenesulfonate, sodium cumenesulfonate and sodium butylmonoglycol sulfate.

The present invention also provides for the use of the trisazo metal complex dyes of the invention for dyeing and printing natural and synthetic fiber materials (eg. polyester, silk, wool, blend fabrics), especially for recording script and images on various recording media, and also for pulp coloring paper or celluloses.

The trisazo metal complex dyes of the invention are useful for example as colorants in electrophotographic toners and developers, for example one-component and two-component powder toners, magnetic toners, liquid toners, polymerization toners and also other specialty toners.

Typical toner binders are addition polymerization, polyaddition and polycondensation resins, such as styrene, styrene-acrylate, styrene-butadiene, acrylate, polyester, phenolic and epoxy resins, polysulfones, polyurethanes, individually or in combination, also polyethylene and polypropylene, which each may include further ingredients such as charge control agents, waxes or flow agents, or are subsequently modified with these additives.

The trisazo metal complex dyes of the invention are further useful as colorants in powders and powder coatings, especially in triboelectrically or electrostatically sprayed powder coatings used for surface coating of objects composed for example of metal, wood, plastic, glass, ceramic, concrete, textile material, paper or rubber.

Powder coating resins used are typically epoxy resins, carboxyl- and hydroxyl-containing polyester resins, polyurethane and acrylic resins together with customary curing agents. Combinations of resins are also used. For instance, epoxy resins are frequently used in combination with carboxyl- and hydroxyl-containing polyester resins.

The complex dyes of the invention are also useful as colorants for color filters, not only for additive but also subtractive color generation (P. Gregory "Topics in Applied Chemistry: High Technology Applications of Organic Colorants" Plenum Press, New York 1991, pages 15–25).

In the applications described, the complex dyes of the invention may also be used as dye mixtures with each or one another or with other dyes and/or pigments.

Furthermore, the dyes of the invention may be used as ink set in conjunction with yellow, magenta and cyan shades. The yellow, magenta and cyan shades include not only dyes such as, for example, C.I. Acid Yellow 17, C.I. Acid Yellow 23, C.I. Direct Yellow 86, C.I. Direct Yellow 98, C.I. Direct Yellow 132, C.I. Reactive Yellow 37, C.I. Acid Red 52, C.I. Acid Red 289, C.I. Reactive Red 23, C.I. Reactive Red 180, C.I. Acid Blue 9, C.I. Direct Blue 199, but also pigments, such as C.I. Pigment Yellow 17, C.I. Pigment Yellow 74, C.I. Pigment Yellow 83, C.I. Pigment Yellow 97, C.I. Pigment Yellow 120, C.I. Pigment Yellow 139, C.I. Pigment Yellow 151, C.I. Pigment Yellow 155, C.I. Pigment Yellow 180, C.I. Pigment Red 57:1, C.I. Pigment Red 122, C.I. Pigment Red 146, C.I. Pigment Red 176, C.I. Pigment Red 184, C.I. Pigment Red 185, C.I. Pigment Red 269, C.I. Pigment Violet 19, C.I. Pigment Blue 15, C.I. Pigment Blue 15:3, C.I. Pigment Blue 15:4.

In the case of reactive dyes, dyes which have been reacted with nucleophiles can also be used in ink sets.

The dyes of the invention are particularly useful for preparing recording fluids, especially aqueous and nonaqueous inks for the inkjet printing process, and also for such inks as work by the hot-melt process or are based on microemulsions, but also for other printing, duplicating, marking, writing, drawing, stamping or registering processes.

In addition, the complex dyes of the invention are useful for coloring organic and inorganic materials.

The present invention also provides recording fluids comprising one or more of the dyes according to the invention with or without other water-soluble dyes for shading. The exact composition of the recording fluid has to be adapted to the intended purpose.

The ready-prepared recording fluids generally include a total of 0.1 to 50% by weight of one or more, for example 2, 3 or 4, of the trisazo metal complex dyes, 0 to 99% by weight of water and 0.5 to 99.5% by weight of organic solvent and/or humectant. In a preferred embodiment, the recording fluids include 0.5 to 15% by weight of dye, 35 to 75% by weight of water and 10 to 50% by weight of organic solvent and/or humectant; another preferred embodiment may include 0.5 to 15% by weight of dye, 0 to 20% by weight of water and 70 to 99.5% by weight of organic solvent and/or humectant. The ready-prepared recording fluids may include further additives mentioned hereinbelow.

Water used for preparing the recording fluids is preferably used in the form of distilled or demineralized water. The solvents and/or humectants included in the recording fluids may be an organic solvent or a mixture of such solvents, in which case water-miscible solvents are preferred. Useful solvents include for example mono- or polyhydric alcohols, their ethers and esters, for example methanol, ethanol, propanol, isopropanol, butanol, isobutanol; di- or trihydric alcohols, especially of 2 to 6 carbon atoms, for example ethylene glycol, propylene glycol, 1,3-propanediol, 1,4-butanediol, 1,5-pentanediol, 1,6-hexanediol, 1,2,6-hexanetriol, glycerol, diethylene glycol, dipropylene glycol, triethylene glycol, polyethylene glycol, tripropylene glycol, polypropylene glycol; lower alkyl ethers of polyhydric alcohols, for example ethylene glycol monomethyl, monoethyl or monobutyl ether, triethylene glycol monomethyl or monoethyl ether; ketones and ketone alcohols such as, for example, acetone, methyl ethyl ketone, diethyl ketone, methyl isobutyl ketone, methyl pentyl ketone, cyclopentanone, cyclohexanone, diacetone alcohol; amides, for example dimethylformamide, dimethylacetamide, N-methylpyrrolidone; also urea, tetramethylurea, thiodiglycol, ε-caprolactam.

The recording fluids of the invention may further include customary additives, for example preservatives, cationic, anionic or nonionic surface-active substances (surfactants and wetting agents) and also viscosity regulators, for example polyvinyl alcohol, cellulose derivatives or water-soluble natural or synthetic resins as film formers or binders to enhance the adhesiveness and abrasion resistance.

Amines, for example ethanolamine, diethanolamine, triethanolamine, N,N-dimethylethanolamine and diisopropylamine, are mainly used to raise the pH of the recording fluid. They are normally present in the recording fluid at 0 to 10% by weight, preferably 0.5 to 5% by weight.

The recording fluids for the inkjet printing process may include further additives depending on the embodiment of this printing process, for example whether it is a continuous jet, intermittent jet, impulse jet or compound jet process, for example to buffer the pH, to adjust the electrical conductivity, the specific heat capacity, the thermal expansion coefficient and the conductivity.

Stored recording fluids according to the invention do not form precipitates leading to poorly defined prints or nozzle cloggage.

The recording fluids of the invention are in terms of viscosity and surface tension in the ranges suitable for the inkjet process. They provide printed images possessing high optical density and excellent lightfastness, waterfastness, abrasion resistance and resolution.

EXAMPLES

Example 1

0.05 mol of 1-hydroxy-7-amino-3-naphthoic acid (14) is introduced into 18 ml of hydrochloric acid (10N) and the mixture is stirred at room temperature for 18 hours. Then about 15 g of ice are added to the reaction vessel, 3.6 g of sodium nitrite (dissolved in 10 ml of salt-free water) are added dropwise over 1–2 hours, and the mixture is subsequently stirred at 5–8° C. for 4 hours. The excess nitrite is removed with sulfamic acid. The diazotized naphthoic acid is subsequently added over 10 min to a solution of 3-carboxy-5-hydroxy-1-(4 -sulfophenyl)-4-pyrazole (19) (0.05 mol in 60 ml of demineralized water) which has been set to a pH of 4–6 with aqueous sodium hydroxide solution and cooled with 25 g of ice. 5 g of sodium acetate are added, the pH is adjusted to 3–5 with 10 g of sodium bicarbonate and the mixture is subsequently stirred at 15–20° C. for 6 hours to form the compound of the formula (20).

In a separate vessel, 0.05 mol of 2-[(4-amino-3-methoxyphenyl)azo]-naphthalene-6,8-disulfonic acid (21) is admixed with 10 ml of hydrochloric acid (10N) and 3.4 g of sodium nitrite (in 10 ml of water) are added dropwise to this solution over 45 min. The excess of sodium nitrite is destroyed with sulfamic acid. The suspension thus obtained is added dropwise to the compound of the formula (20) and the mixture is adjusted to pH 5–6 with sodium carbonate. To finally copper the resultant trisazo compound of the formula (22), the pH is adjusted to 3–5 and 7.8 g of copper sulfate and 5.7 g of sodium acetate are added to the reaction mixture. The batch is transferred into an autoclave and stirred at 100–120° C. and 3 bar for 12–20 hours. After the reaction has ended, 6 g of thiosulfate are added and the batch is stirred at 80–100° C. for 4–6 hours. The dye solution is subsequently desalted by membrane filtration and dried.

Yield: 52 g of black powder

UV-VIS (2.238 mg/100 ml): $\lambda_{max}^1$=412 nm $\lambda_{max}^2$=582 nm

IR (KBr): 3433 (COOH), 1637 (C=C), 1459, 1191 ($SO_3^-$) cm$^{-1}$.

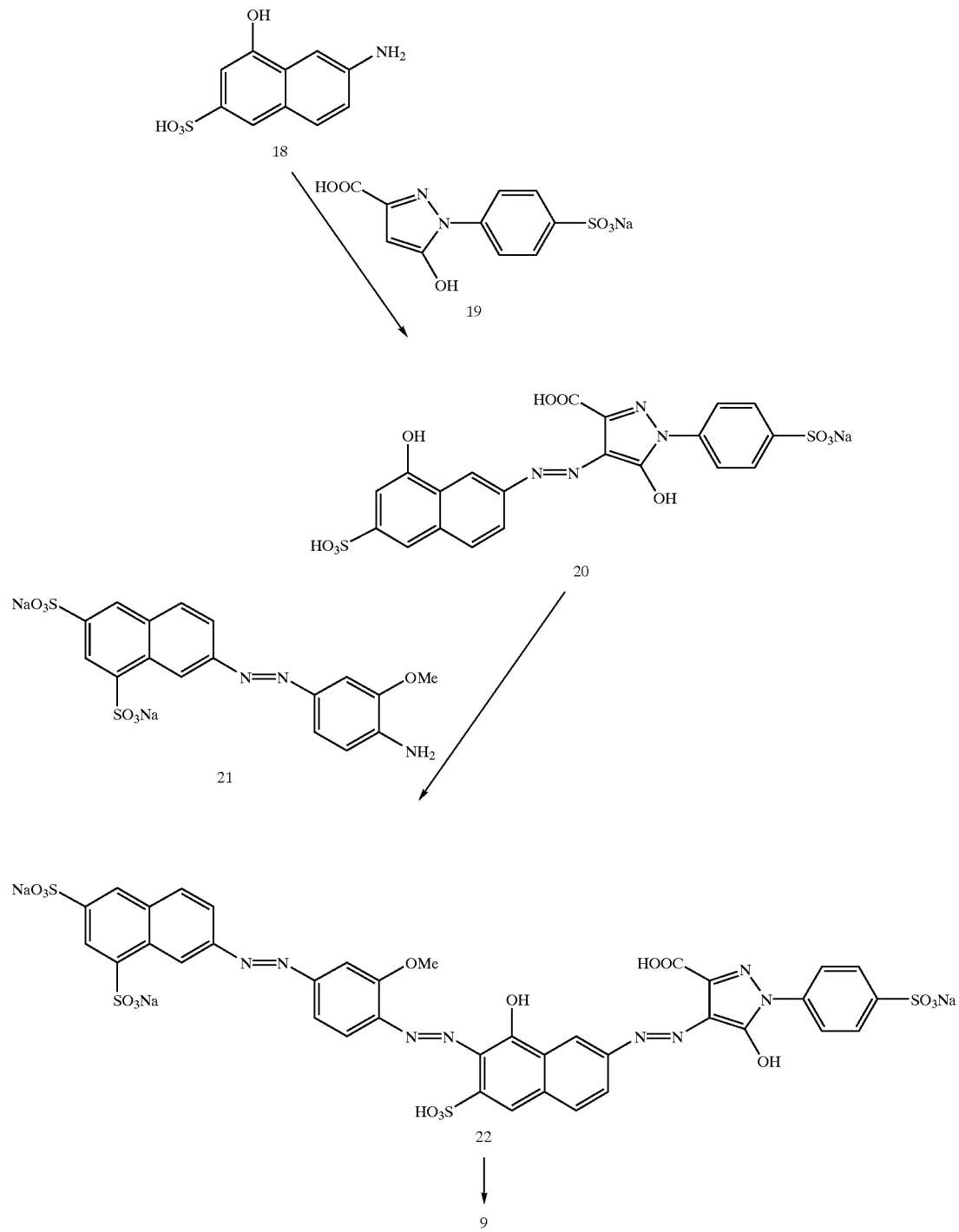

Example 2

Dye (9) prepared according to example 1 is admixed with 0.2% by weight of a preservative, for example Mergal K 10 N, after the desalting step, to obtain a stable dye solution (10% by weight) which is very useful for preparing recording fluids for the inkjet process.

Example 3

Example of the preparation of a recording fluid having a pure dye content of 4% by weight:

4 g of desalted pure dye as per example 1 are introduced with stirring at 25° C. into a mixture 20.0 g of diethylene glycol, 2.5 g N-methylpyrrolidone, 1.0 g of triethanolamine and 76.5 g of demineralized water and dissolved therein. The ink thus prepared provides jet black prints possessing very good light- and waterfastness.

Example 4

0.05 mol of 2-[(4-amino-3-methoxyphenyl)azo]-naphthalene-6,8-disulfonic acid (21) is admixed with 10 ml of hydrochloric acid (10N) and cooled to 0–5° C. with ice. 3.4 g of sodium nitrite (in 10 ml of water) are added dropwise to this solution over 45 min. The excess of sodium nitrite is destroyed with sulfamic acid. The suspension thus obtained is added dropwise at 0–5° C. to a solution, adjusted to pH 8.5–9.0, of 0.05 mol of 1-hydroxy-7-amino-3-naphthoic acid (18). During the coupling the pH is maintained at 8.5–9.0 with sodium carbonate. Then the pH is adjusted to<1 with hydrochloric acid, 15 g of ice are added to the reaction vessel and 3.8 g of sodium nitrite (dissolved in 10 ml of salt-free water) are added dropwise over 1–2 hours and the batch is subsequently stirred at 5–10° C. for 4 hours. The excess of nitrite is removed with sulfamic acid. The diazotized building block is subsequently added over 10 min to a solution of 3-carboxy-5-hydroxy-1-(4-sulfophenyl)-4-pyrazole (19) (0.05 mol in 60 ml of demineralized water) which has been adjusted to pH 4–6 with aqueous sodium hydroxide solution and cooled with 25 g of ice. 5 g of sodium acetate are added, the pH is adjusted to 3–5 with 10 g of sodium bicarbonate and the batch is subsequently stirred at 15–20° C. for 6 hours to form the compound of the formula (22). The dye solution is then admixed with 12 g of diethanolamine. This solution is admixed with a solution which has been heated to 60° C. and consists of 13 g of copper sulfate (dissolved in 50 ml of water) and 21 ml of ammonia (25%). After the batch has been heated to 88–90° C., this temperature is maintained for 4 hours, and finally the addition of thiosulfate and the membrane filtration are carried out similarly to the description in example 1.

Yield: 53 g of black powder

UV-VIS (2.442 mg/100 ml): $\lambda_{max}^1$=414 nm $\lambda_{max}^2$=583 nm

IR (KBr): 3435 (COOH), 1640 (C=C), 1460, 1194 ($SO_3^-$) cm$^{-1}$.

Example 5

0.05 mol of 1-[(4-amino-3-methoxyphenyl)azo]-phenyl-4-sulfonic acid is admixed with 10 ml of hydrochloric acid (10N) and cooled to 0–5° C. with ice. 3.4 g of sodium nitrite (in 10 ml of water) are added dropwise to this solution over 45 min. The excess of sodium nitrite is destroyed with sulfamic acid. The suspension thus obtained is added dropwise at 0–5° C. to a solution, adjusted to pH 8.5–9.0, of 0.05 mol of 1-hydroxy-7-amino-3-naphthoic acid. During the coupling the pH is maintained at 8.5–9.0 with sodium carbonate. Then the pH is adjusted to<1 with hydrochloric acid, 15 g of ice are added to the reaction vessel and 3.8 g of sodium nitrite (dissolved in 10 ml of salt-free water) are added dropwise over 1–2 hours and the batch is subsequently stirred at 5–10° C. for 4 hours. The excess of nitrite is removed with sulfamic acid. The diazotized building block is subsequently added over 10 min to a solution of 2-hydroxynapthalene-3,6-dicarboxylic acid (0.05 mol in 60 ml of demineralized water) which has been adjusted to pH 8–9 with aqueous sodium hydroxide solution and cooled with 25 g of ice. 5 g of sodium carbonate are added and the batch is subsequently stirred at 15–20° C. for 6 hours. The dye solution is then admixed with 12 g of diethanolamine. This solution is admixed with a solution which has been heated to 60° C. and consists of 13 g of copper sulfate (dissolved in 50 ml of water) and 21 ml of ammonia (25%). After the batch has been heated to 88–90° C., this temperature is maintained for 4 hours, and finally the addition of thiosulfate and the membrane filtration are carried out similarly to the description in example 1.

Drying provides dye (5) in a yield of 51 g as a black powder.

UV-VIS (2.440 mg/100 ml): $\lambda_{max}^1$=420 nm $\lambda_{max}^2$=598 nm

IR (KBr): 3420 (COOH), 1650 (C=C), 1420, 1180 ($SO_3^-$) cm$^{-1}$.

Example 6

0.05 mol of 1-[(4-amino-3-methoxyphenyl)azo]-phenyl-3,5-dicarboxylic acid is admixed with 10 ml of hydrochloric acid (10N) and cooled to 0–5° C. with ice. 3.4 g of sodium nitrite (in 10 ml of water) are added dropwise to this solution over 45 min. The excess of sodium nitrite is destroyed with sulfamic acid. The suspension thus obtained is added dropwise at 0–5° C. to a solution, adjusted to pH 8.5–9.0, of 0.05 mol of 1-hydroxy-7-amino-3-naphthoic acid. During the coupling the pH is maintained at 8.5–9.0 with sodium carbonate. Then the pH is adjusted to <1 with hydrochloric acid, 15 g of ice are added to the reaction vessel and 3.8 g of sodium nitrite (dissolved in 10 ml of salt-free water) are added dropwise over 1–2 hours and the batch is subsequently stirred at 5–10° C. for 4 hours. The excess of nitrite is removed with sulfamic acid. The diazotized building block is subsequently added over 10 min to a solution of 2-hydroxynaphthalene-3-carboxylic acid (0.05 mol in 60 ml of demineralized water) which has been adjusted to pH 8–9 with aqueous sodium hydroxide solution and cooled with 25 g of ice. 5 g of sodium carbonate are added and the batch is subsequently stirred at 15–20° C. for 6 hours. The dye solution is then admixed with 12 g of diethanolamine. This solution is admixed with a solution which has been heated to 60° C. and consists of 13 g of copper sulfate (dissolved in 50 ml of water) and 21 ml of ammonia (25%). After the batch has been heated to 88–90° C., this temperature is maintained for 4 hours, and finally the addition of thiosulfate and the membrane filtration are carried out similarly to the description in example 1.

Drying provides dye (6) in a yield of 54 g as a black powder.

UV-VIS (2.450 mg/100 ml): $\lambda_{max}^1$=411 nm $\lambda_{max}^2$=589 nm

IR (KBr): 3410 (COOH), 1660 (C=C), 1420, 1190 ($SO_3^-$) cm$^{-1}$.

Example 7

0.05 mol of 2-[(4-amino-3-methoxyphenyl)azo]-naphthalene-4,8-disulfonic acid is admixed with 10 ml of hydrochloric acid (10N) and cooled to 0–5° C. with ice. 3.4 g of sodium nitrite (in 10 ml of water) are added dropwise to this solution over 45 min. The excess of sodium nitrite is destroyed with sulfamic acid. The suspension thus obtained is added dropwise at 0–5° C. to a solution, adjusted to pH 8.5–9.0, of 0.05 mol of 1-hydroxy-7-amino-3-naphthoic acid. During the coupling the pH is maintained at 8.5–9.0 with sodium carbonate. Then the pH is adjusted to <1 with hydrochloric acid, 15 g of ice are added to the reaction vessel and 3.8 g of sodium nitrite (dissolved in 10 ml of salt-free water) are added dropwise over 1–2 hours and the batch is subsequently stirred at 5–10° C. for 4 hours. The excess of nitrite is removed with sulfamic acid. The diazotized building block is subsequently added over 10 min to a solution of 2-hydroxynaphthalene-3,6-dicarboxylic acid (0.05 mol in 60 ml of demineralized water) which has been adjusted to pH 8–9 with aqueous sodium hydroxide solution and cooled with 25 g of ice. 5 g of sodium carbonate are added and the batch is subsequently stirred at 15–20° C. for 6 hours. The dye solution is then admixed with 12 g of diethanolamine. This solution is admixed with a solution which has been heated to 60° C. and consists of 13 g of copper sulfate (dissolved in 50 ml of water) and 21 ml of ammonia (25%). After the batch has been heated to 88–90° C., this temperature is maintained for 4 hours, and finally the addition of thiosulfate and the membrane filtration are carried out similarly to the description in example 1.

Drying provides dye (7) in a yield of 52 g as a black powder.

UV-VIS (2.428 mg/100 ml): $\lambda_{max}^1$=415 nm $\lambda_{max}^2$=588 nm

IR (KBr): 3440 (COOH), 1660 (C=C), 1450, 1170 ($SO_3^-$) cm$^{-1}$.

Example 8

0.05 mol of 1-[(4-amino-3-methoxyphenyl)azo]-phenyl-3-sulfonic acid is admixed with 10 ml of hydrochloric acid (10N) and cooled to 0–5° C. with ice. 3.4 g of sodium nitrite (in 10 ml of water) are added dropwise to this solution over 45 min. The excess of sodium nitrite is destroyed with sulfamic acid. The suspension thus obtained is added dropwise at 0–5° C. to a solution, adjusted to pH 8.5–9.0, of 0.05 mol of 1-hydroxy-7-amino-3-naphthoic acid. During the coupling the pH is maintained at 8.5–9.0 with sodium carbonate. Then the pH is adjusted to <1 with hydrochloric acid, 15 g of ice are added to the reaction vessel and 3.8 g of sodium nitrite (dissolved in 10 ml of salt-free water) are added dropwise over 1–2 hours and the batch is subsequently stirred at 5–10° C. for 4 hours. The excess of nitrite is removed with sulfamic acid. The diazotized building block is subsequently added over 10 min to a solution of 3-carboxy-5-hydroxy-1-(4-sulfophenyl)-4-pyrazole (0.05 mol in 60 ml of demineralized water) which has been adjusted to pH 4–6 with aqueous sodium hydroxide solution and cooled with 25 g of ice. 5 g of sodium acetate are added, the pH is adjusted to 3–5 with 10 g of sodium bicarbonate and the batch is subsequently stirred at 15–20° C. for 6 hours. The dye solution is then admixed with 12 g of diethanolamine. This solution is admixed with a solution which has been heated to 60° C. and consists of 13 g of copper sulfate (dissolved in 50 ml of water) and 21 ml of ammonia (25%). After the batch has been heated to 88–90° C., this temperature is maintained for 4 hours, and finally the addition of thiosulfate and the membrane filtration are carried out similarly to the description in example 1.

Drying provides dye (8) in a yield of 50 g as a black powder.

UV-VIS (2.266 mg/100 ml): $\lambda_{max}^1$=438 nm $\lambda_{max}^2$=588 nm

IR (KBr): 3425 (COOH), 1645 (C=C), 1470, 1185 ($SO_3^-$) cm$^{-1}$.

Example 9

0.05 mol of 2-hydroxy-1-[(4-amino-3-methoxyphenyl) azo]-naphthalene-4-sulfonic acid is admixed with 10 ml of hydrochloric acid (10N) and cooled to 0–5° C. with ice. 3.4 g of sodium nitrite (in 10 ml of water) are added dropwise to this solution over 45 min. The excess of sodium nitrite is destroyed with sulfamic acid. The suspension thus obtained is added dropwise at 0–5° C. to a solution, adjusted to pH 8.5–9.0, of 0.05 mol of 1-hydroxy-7-amino-3-naphthoic acid. During the coupling the pH is maintained at 8.5–9.0 with sodium carbonate. Then the pH is adjusted to<1 with hydrochloric acid, 15 g of ice are added to the reaction vessel and 3.8 g of sodium nitrite (dissolved in 10 ml of salt-free water) are added dropwise over 1–2 hours and the batch is subsequently stirred at 5–10° C. for 4 hours. The excess of nitrite is removed with sulfamic acid. The diazotized building block is subsequently added over 10 min to a solution of 3-carboxy-5-hydroxy-1-(4-sulfophenyl)-4-pyrazole (0.05 mol in 60 ml of demineralized water) which has been adjusted to pH 4–6 with aqueous sodium hydroxide solution and cooled with 25 g of ice. 5 g of sodium acetate are added, the pH is adjusted to 3–5 with 10 g of sodium bicarbonate and the batch is subsequently stirred at 15–20° C. for 6 hours. The dye solution is then admixed with 12 g of diethanolamine. This solution is admixed with a solution which has been heated to 60° C. and consists of 13 g of copper sulfate (dissolved in 50 ml of water) and 21 ml of ammonia (25%). After the batch has been heated to 88–90° C., this temperature is maintained for 4 hours, and finally the addition of thiosulfate and the membrane filtration are carried out similarly to the description in example 1. Drying provides dye (10) in a yield of 53 g as a black powder.

UV-VIS (2.326 mg/100 ml): $\lambda_{max}^1$=430 nm $\lambda_{max}^2$=580 nm

IR (KBr): 3440 (COOH), 1645 (C=C), 1470, 1175 ($SO_3^-$) cm$^{-1}$.

Example 10

0.05 mol of 2-[(4-amino-3-methoxy-6-methylphenyl) azo]-naphthalene-4,8-disulfonic acid is admixed with 10 ml of hydrochloric acid (10N) and cooled to 0–5° C. with ice. 3.4 g of sodium nitrite (in 10 ml of water) are added dropwise to this solution over 45 min. The excess of sodium nitrite is destroyed with sulfamic acid. The suspension thus obtained is added dropwise at 0–5° C. to a solution, adjusted to pH 8.5–9.0, of 0.05 mol of 1-hydroxy-7-amino-3-naphthoic acid. During the coupling the pH is maintained at 8.5–9.0 with sodium carbonate. Then the pH is adjusted to <1 with hydrochloric acid, 15 g of ice are added to the reaction vessel and 3.8 g of sodium nitrite (dissolved in 10 ml of salt-free water) are added dropwise over 1–2 hours and the batch is subsequently stirred at 5–10° C. for 4 hours. The excess of nitrite is removed with sulfamic acid. The diazotized building block is subsequently added over 10 min to a solution of 1-hydroxy-7-amino-3-naphthoic acid (0.05 mol in 60 ml of demineralized water) which has been adjusted to pH 4–6 with aqueous sodium hydroxide solution and cooled with 25 g of ice. 5 g of sodium acetate are added, the pH is adjusted to 3–4 with 10 g of sodium bicarbonate and the batch is subsequently stirred at 15–20° C. for 6 hours. The dye solution is then admixed with 12 g of diethanolamine. This solution is admixed with a solution which has been heated to 60° C. and consists of 13 g of copper sulfate (dissolved in 50 ml of water) and 21 ml of ammonia (25%). After the batch has been heated to 88–90° C., this temperature is maintained for 4 hours, and finally the addition of thiosulfate and the membrane filtration are carried out similarly to the description in example 1. Drying provides dye (11) in a yield of 52 g as a black powder.

UV-VIS (2.288 mg/100 ml): $\lambda_{max}^1$=418 nm $\lambda_{max}^2$=570 nm

IR (KBr): 3455 (COOH), 1660 (C=C), 1440, 1170 ($SO_3^-$ cm$^{-1}$).

Example 11

0.05 mol of 1-[(4-amino-3-carboxyphenyl)azo]-phenyl-3-sulfonic acid is admixed with 10 ml of hydrochloric acid (10N) and cooled to 0–5° C. with ice. 3.4 g of sodium nitrite (in 10 ml of water) are added dropwise to this solution over 45 min. The excess of sodium nitrite is destroyed with sulfamic acid. The suspension thus obtained is added dropwise at 0–5° C. to a solution, adjusted to pH 8.5–9.0, of 0.05 mol of 1-hydroxy-7-amino-3-naphthoic acid. During the coupling the pH is maintained at 8.5–9.0 with sodium carbonate. Then the pH is adjusted to <1 with hydrochloric acid, 15 g of ice are added to the reaction vessel and 3.8 g of sodium nitrite (dissolved in 10 ml of salt-free water) are added dropwise over 1–2 hours and the batch is subsequently stirred at 5–10° C. for 4 hours. The excess of nitrite is removed with sulfamic acid. The diazotized building block is subsequently added over 10 min to a solution of 3-carboxy-5-hydroxy-1-(4-sulfophenyl)-4-pyrazole (0.05 mol in 60 ml of demineralized water) which has been adjusted to pH 4–6 with aqueous sodium hydroxide solution and cooled with 25 g of ice. 5 g of sodium acetate are added, the pH is adjusted to 3–5 with 10 g of sodium bicarbonate and the batch is subsequently stirred at 15–20° C. for 6 hours. The dye solution is then admixed with 12 g of diethanolamine. This solution is admixed with a solution which has been heated to 60° C. and consists of 13 g of copper sulfate (dissolved in 50 ml of water) and 21 ml of ammonia (25%). After the batch has been heated to 88–90° C., this temperature is maintained for 4 hours, and finally the addition of thiosulfate and the membrane filtration are carried out similarly to the description in example 1.

Drying provides dye (12) in a yield of 51 g as a black powder.

UV-VIS (2.646 mg/100 ml): $\lambda_{max}^1$=428 nm $\lambda_{max}^2$=590 nm

IR (KBr): 3430 (COOH), 1650 (C=C), 1465, 1180 ($SO_3^-$) cm$^{-1}$.

Example 12

0.05 mol of 1-[(4-amino-3-methoxyphenyl)azo]-phenyl-3-sulfonic acid is admixed with 10 ml of hydrochloric acid (10N) and cooled to 0–5° C. with ice. 3.4 g of sodium nitrite (in 10 ml of water) are added dropwise to this solution over 45 min. The excess of sodium nitrite is destroyed with sulfamic acid. The suspension thus obtained is added dropwise at 0–5° C. to a solution, adjusted to pH 8.5–9.0, of 0.05 mol of 1-hydroxy-7-amino-3-naphthoic acid. During the coupling the pH is maintained at 8.5–9.0 with sodium carbonate. Then the pH is adjusted to <1 with hydrochloric acid, 15 g of ice are added to the reaction vessel and 3.8 g of sodium nitrite (dissolved in 10 ml of salt-free water) are added dropwise over 1–2 hours and the batch is subsequently stirred at 5–10° C. for 4 hours. The excess of nitrite is removed with sulfamic acid. The diazotized building block is subsequently added over 10 min to a solution of 2-hydroxynaphthalene-3-N-phenylcarboxamide (0.05 mol in 60 ml of demineralized water) which has been adjusted to pH 8–9 with aqueous sodium hydroxide solution and cooled with 25 g of ice. 5 g of sodium carbonate are added and the batch is subsequently stirred at 15–20° C. for 6 hours. The dye solution is then admixed with 12 g of diethanolamine. This solution is admixed with a solution which has been heated to 60° C. and consists of 13 g of copper sulfate (dissolved in 50 ml of water) and 21 ml of ammonia (25%). After the batch has been heated to 88–90° C., this temperature is maintained for 4 hours, and finally the addition of thiosulfate and the membrane filtration are carried out similarly to the description in example 1.

Drying provides dye (13) in a yield of 54 g as a black powder.

UV-VIS (2.400 mg/100 ml): $\lambda_{max}^1$=419 nm $\lambda_{max}^2$=581 nm

IR (KBr): 3445 (COOH), 1660 (C=C), 1420, 1155 ($SO_3^-$) cm$^{-1}$.

What is claimed is:

1. A metal complex of a triazo dye of the general formula (4)

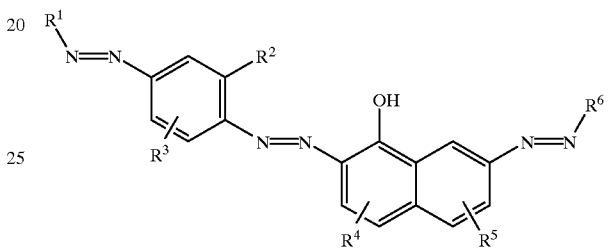

(4)

where $R^1$ is aryl substituted by one or more substituents selected from the group consisting of OH, O($C_1$–$C_6$)-alkyl, O($C_1$–$C_6$)-alkyl-COOM, O($C_1$–$C_6$)-alkyl-$SO_3$M, O(hydroxy($C_1$–$C_6$)-alkyl), ($C_1$–$C_6$)-alkyl, COOM, $SO_3$M, $SO_2NH_2$, $SO_2$N(hydroxy($C_1$–$C_6$)-alkyl)$_2$, $SO_2$NH($C_1$–$C_6$)-alkyl, $SO_2$N(($C_1$–$C_6$)-alkyl)$_2$, $NH_2$, NH($C_1$–$C_6$)-alkyl, NHacyl, NHaryl, N(hydroxy ($C_1$–$C_6$)-alkyl)$_2$, N(($C_1$–$C_6$)-alkyl)$_2$ and halogen;

$R^2$ is OH, O($C_1$–$C_6$)-alkyl, COOM or $SO_3$M;

$R^3$, $R^4$ and $R^5$ are identical or different and are each selected from the group consisting of H, OH, O($C_1$–$C_6$)-alkyl, O($C_1$–$C_6$)-alkyl-COOM, O($C_1$–$C_6$)-alkyl-$SO_2$M, O(hydroxy($C_1$–$C_6$)-alkyl), ($C_1$–$C_6$)-alkyl, COOM, $SO_3$M, $SO_2NH_2$, $SO_2$N(hydroxy($C_1$–$C_8$)-alkyl)$_2$, $SO_2$NH($C_1$–$C_6$)-alkyl, $SO_2$N(($C_1$–$C_6$)-alkyl)$_2$, $NH_2$, NH($C_1$–$C_5$)-alkyl, NHacyl, NHaryl, N(hydroxy ($C_1$–$C_6$)-alkyl)$_2$, N(($C_1$–$C_6$)-alky)$_2$, and halogen, $R^6$ is a heterocyclic aromatic which is unsubstituted or substituted by one or more substituents selected from the group consisting of OH, O($C_1$–$C_6$)-alkyl, O($C_1$–$C_6$)-alkyl-COOM, O($C_1$–$C_6$)-alkyl-$SO_3$M, O(hydroxy($C_1$–$C_6$)-alkyl), ($C_1$–$C_6$)-alkyl, COOM, $SO_3$M, $SO_2NH_2$, CONH-phenyl, $SO_2$NH-phenyl, $SO_2$N(hydroxy($C_1$–$C_6$)-alkyl)$_2$, $SO_2$NH($C_1$–$C_8$)-alkyl, $SO_2$N(($C_1$–$C_6$)-alkyl)$_2$, $NH_2$, NH($C_1$–$C_6$)-alkyl, NHacyl, NHaryl, N(hydroxy($C_1$–$C_6$)-alkyl)$_2$, N(($C_1$–$C_6$)-alkyl)$_2$, halogen and phenylsulfo, or is a similarly substituted pyrazole or pyridone radical; and M is hydrogen, a monovalent metal cation, one equivalent of a polyvalent metal cation or an unsubstituted or alkyl-, alkoxyalkyl- or hydroxyalkyl-substituted ammonium ion.

2. A metal complex as claimed in claim 1, wherein $R^1$ is a phenyl or naphthalene radical substituted by 1, 2 or 3 substituents selected from the group consisting of OH, O($C_1$–$C_6$)-alkyl, COOM, $SO_3$M and $NH_2$.

3. A metal complex as claimed in claim 1, wherein $R^2$ is OH or COOM.

4. A metal complex as claimed in claim 1, wherein $R^3$ is H, methyl or $O(C_1-C_6)$-alkyl.

5. A metal complex as claimed in claim 1, wherein $R^4$ is H, COOM or $SO_3M$.

6. A metal complex as claimed in claim 1, wherein $R^5$ is H, COOM or $SO_3M$.

7. A metal complex as claimed in claim 1, wherein $R^6$ is a pyridyl or pyrazole radical substituted by 1, 2 or 3 substituents selected from the group consisting of OH, $O(C_1-C_6)$-alkyl, COOM, $SO_3M$, $NH_2$, NHaryl, NHacyl and phenylsulfo.

8. A metal complex as claimed in claim 1, characterized by the compound of the formula (4a)

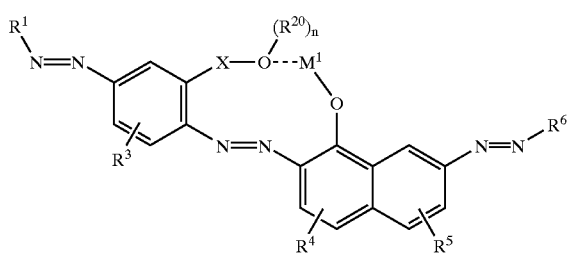

(4a)

where
$M^1$ is Al, Cr, Fe, Co, Ni or Cu,
$R^{20}$ is $C_1-C_6$-alkyl,
n is 0 or 1, and
X is a chemical bond, —CO— or —$SO_2$—.

9. A process for preparing a metal complex of a trisazo dye as claimed in claim 1, which comprises diazotizing a naphtholamine of the formula (14)

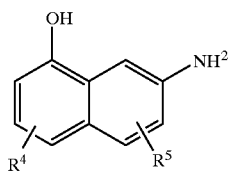

(14)

to give a diazonium salt, coupling said diazonium salt with a compound of the formula (15)

 (15)

to give a compound of formula (16), coupling said compound of the formula (16)

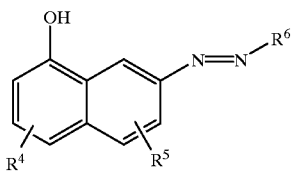

(16)

with the diazonium salt of the formula (17)

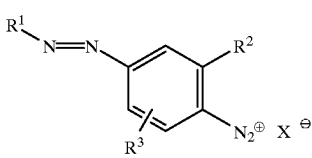

(17)

where $X^\ominus$ is an anion, and complexing with a metal salt solution.

10. A method for dyeing and printing natural or synthetic fiber materials, paper, electrophotographic toners, recording fluids and powder coating comprising the step of adding a metal complex of a disazo dye as claimed in claim 1 to said fiber material, paper, a binder for an electrophotographic toner or powder coating, or to a base of a recording fluid.

11. A recording fluid comprising one or more metal complex dyes as claimed in claim 1.

12. A recording fluid as claimed in claim 11, including 0.1 to 50% by weight of one or more of the metal complex dyes, 0 to 99% by weight of water and 0.5 to 99.5% by weight of organic solvents, humectants or a combination thereof.

13. A recording fluid as claimed in claim 11, including 0.5 to 15% by weight of one or more of the metal complex dyes, 35 to 75% by weight of water and 10 to 50% by weight of organic solvents, humectants or a combination thereof.

14. A recording fluid as claimed in claim 11, including 0.5 to 15% by weight of one or more of the metal complex dyes, 0 to 20% by weight of water and 70 to 99.5% by weight of organic solvents, humectants or a combination thereof.

* * * * *